No. 840,338. PATENTED JAN. 1, 1907.
H. E. JOHNSON.
HARVESTER ATTACHMENT.
APPLICATION FILED AUG. 16, 1906.
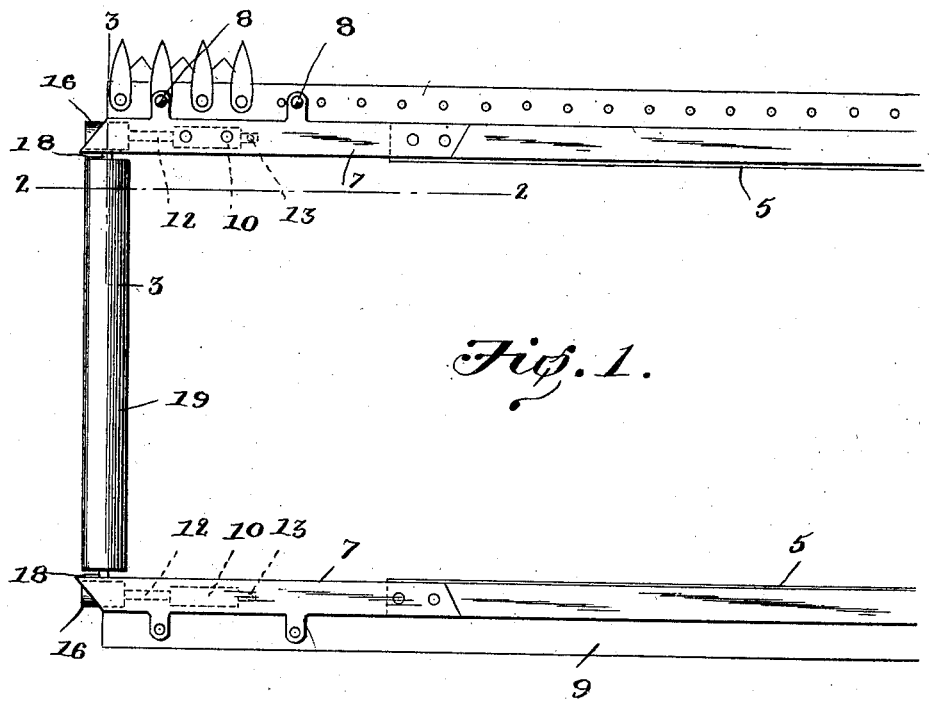
Fig. 1.
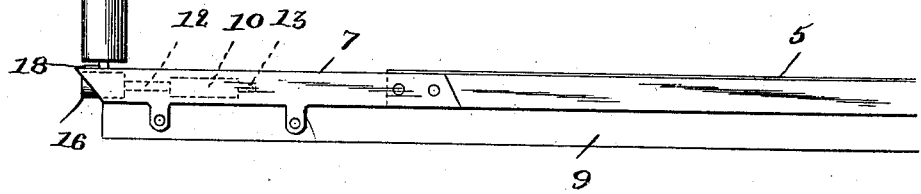
Fig. 2.  Fig. 3.
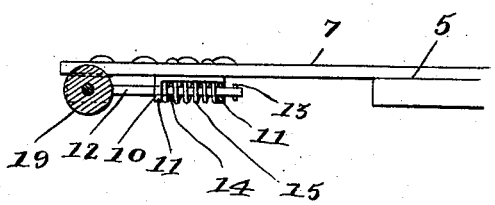
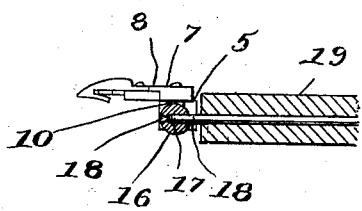
Witnesses
W. S. Rockwell
F. B. MacNab
Inventor
Hadfield E. Johnson
By
Attorneys

UNITED STATES PATENT OFFICE.

HADFIELD E. JOHNSON, OF AXEL, MINNESOTA.

HARVESTER ATTACHMENT.

No. 840,338.

Specification of Letters Patent.

Patented Jan. 1, 1907.

Application filed August 16, 1906. Serial No. 330,850.

*To all whom it may concern:*

Be it known that I, HADFIELD E. JOHNSON, a citizen of the United States, residing at Axel, in the county of Ottertail, State of Minnesota, have invented certain new and useful Improvements in Harvester Attachments; and I do hereby declare the following to be a full, clear, and exact description of the invention, such as will enable others skilled in the art to which it appertains to make and use the same.

This invention relates to attachments for harvesters, and more particularly to an attachment which will hold the apron of a harvester at a constant tension, but which will give sufficiently when the said apron shrinks from moisture to prevent tearing of the apron.

The primary object of the invention is to provide a device of this nature which will efficiently perform the desired function and which may be manufactured at a low cost and applied with little trouble to any ordinary form of harvester.

In the accompanying drawings, Figure 1 is a bottom plan view of the invention applied to a harvester. Fig. 2 is a detail longitudinal sectional view on the line 2 2 of Fig. 1, and Fig. 3 is a detail transverse sectional view on the line 3 3 of Fig. 1.

Referring to the drawings, the numeral 5 denotes the longitudinal beams of the platform of a harvester, and 6 the tooth-bar, which, together with the frame, is of the ordinary construction.

The numeral 7 denotes a pair of plates which are provided upon one of their edges with apertured ears 8, the said ears serving as a means for securing one of the plates to the tooth-bar 6 and the ears 8 on the other of said plates serving to secure the said plate to a beam 9, which is secured, as usual, to the rear one of the beams 5. At their inner ends the plates 7 are secured to the outer ends of the beams 5.

Bolted or otherwise secured to the under side of each of the plates 7 is a bracket 10, which includes an attaching portion having its ends bent downwardly to form spaced apertured ears 11. Slidably engaged through the apertures in the ears of each bracket 10 is a rod 12, which carries pins 13 and 14, the said pins 13 and 14 being positioned to lie upon corresponding sides of the said ears of each bracket. Disposed upon each of the rods 12 intermediate of the pin 14 and the inner ear of the related bracket is a helical spring 15, which serves to hold the said rod at the limit of its outward sliding movement as determined by the pin 13 and the adjacent ear of the bracket.

At their outer ends each of the rods is provided with a cylindrical bearing-head 16, the said bearing-head being provided with oppositely-disposed alining sockets 17 for the reception of the reduced ends 18 of the apron-roller 19 of the machine. Each of the bearing-heads 16 is provided with an oil-opening 18, which communicates with the bearing-socket 17.

From the foregoing it will be seen that the endless apron of the harvester will be held taut at all times, but that the springs 15 will allow shrinking of the apron without danger of tearing the same.

What is claimed is—

1. In a device of the class described, the combination with the platform of a harvester, of rods slidably mounted upon said platform, springs carried by the rod and arranged to hold the same normally at one limit of their movement, bearing-heads connected directly with and carried by the rods at their outer ends, and a shaft journaled at its ends in said bearing-heads.

2. In a device of the class described, the combination with the platform of a harvester, of rods slidably mounted upon said platform, springs carried by the rod and arranged to hold the same normally at one limit of their movement, heads formed on the outer end of said rod and provided with alining sockets, and a shaft journaled at its ends in said socket.

In testimony whereof I affix my signature in presence of two witnesses.

HADFIELD E. JOHNSON.

Witnesses:
JOHN KRON,
O. KRON.